United States Patent [19]

Kawahara et al.

[11] Patent Number: 5,093,192
[45] Date of Patent: Mar. 3, 1992

[54] MAGNETIC RECORDING MEDIUM

[75] Inventors: Setsuko Kawahara; Yasushi Nakano; Noboru Koyama; Masahiro Umemura, all of Hino, Japan

[73] Assignee: Konica Corporation, Tokyo, Japan

[21] Appl. No.: 495,384

[22] Filed: Mar. 16, 1990

[30] Foreign Application Priority Data

Mar. 28, 1989 [JP] Japan .................. 64-77448
Mar. 30, 1989 [JP] Japan .................. 64-79083

[51] Int. Cl.$^5$ ............................................ G11B 23/00
[52] U.S. Cl. ......................... 428/323; 428/329; 428/425.9; 428/694; 428/900
[58] Field of Search ............ 428/329, 694, 900, 425.9, 428/323

[56] References Cited

U.S. PATENT DOCUMENTS

| | | | |
|---|---|---|---|
| 4,439,796 | 3/1984 | Kitamoto et al. | 360/131 |
| 4,624,883 | 11/1986 | Yamaguchi et al. | 428/694 |
| 4,624,894 | 11/1986 | Kishimoto | 428/328 |
| 4,741,953 | 5/1988 | Katsuta et al. | 428/694 |
| 4,946,374 | 8/1990 | Yamaguchi et al. | 428/694 |
| 4,980,230 | 12/1990 | Saito et al. | 428/329 |

Primary Examiner—Paul J. Thibodeau
Attorney, Agent, or Firm—Jordan B. Bierman

[57] ABSTRACT

A magnetic recording medium which has improved electromagnetic conversion characteristics and running ability and is suitable for high-density recording. The magnetic recording medium has at least two magnetic layers which are provided on one side of a support. One of said magnetic layers contains magnetic particles having an aspect ratio of from 3 to less than 8 and the other one contains magnetic particles having an aspect ration of from 8 to 12.

14 Claims, No Drawings

MAGNETIC RECORDING MEDIUM

FIELD OF THE INVENTION

The present invention relates to a magnetic recording medium, and more particularly to a recording medium having improved electromagnetic conversion characteristic and running durability and is suitable for high-density recording.

BACKGROUND OF THE INVENTION

Recently, digital audio tape recorders have made their appearance in the audio field, while an 8mm-wide tape standard, narrower than the conventional ½ inch-wide standard, has appeared in the VTR field, and these have become growingly popularized, so that there has been a growing demand for improving the magnetic recording medium to be capable of making higher-density recordings: i.e., it is essential to materialize a high-efficiency magnetic recording medium having excellent electromagnetic conversion characteristic and running durability.

In order to meet the demand, various investigations have until now been made; for example, regarding a ferromagnetic powder, it is known that the use of one having a larger specific surface area according to a BET method or a smaller particle size enables to improve the electromagnetic coversion characteristic of a magnetic recording medium. However, the magnetic recording medium comprising a ferromagnetic powder with a large BET value of specific surface area has a problem that it is liable to cause edge creases and shedding trouble and is inferior in the running durability.

On the other hand, the use of a ferromagnetic powder with a small BET value improves the running durability but leaves room for further improvement of the electromagnetic conversion characteristic.

Also, an attempt has been made to compose a magnetic layer of a construction of two layers of which the upper layer contains a ferromagnetic powder having a smaller aspect ratio and the lower layer contains a ferromagnetic powder having a larger aspect ratio, as described in Japanese Patent Publication Open to Public Inspection (hereinafter referred to as Japanese Patent O.P.I. Publication) No. 9813/1982.

However, a magnetic recording medium of such a construction as disclosed in this publication improves the electromagnetic conversion characteristic but is insufficient for the upper layer's adhesion because of the too small aspect ratio of the ferromagnetic powder contained in the upper layer, thus being liable to cause shedding and dropout trouble, which leads to a significant deterioration of the running durability. This problem cannot be covered merely by trying to improve the running durability by relatively increasing the aspect ratio of the ferromagnetic powder contained in the lower layer.

Namely, it could not be successful to improve both the electromagnetic conversion characteristic and the running durability of a magnetic recording medium at the same time through the characteristics of the ferromagnetic powder contained in the magnetic layer. It is the present situation that conventional magnetic recording mediums have not attained technical feasibility for well balancing both electromagnetic conversion characteristic and running durability.

SUMMARY OF THE INVENTION

It is an object of the invention to provide a magnetic recording medium which has improved electromagnetic conversion characteristic and running durability and is suitable for high-density recording.

As a result of continued investigation by the inventors to solve the above problem, it has now been found that a magnetic recording medium comprising at least two magnetic layers containing specific ferromagnetic powders having individually specific aspect ratios is improved in the electromagnetic conversion characteristic and the running durability.

The above-mentioned object of the invention is achieved by a magnetic recording medium comprising a support and at least two magnetic layers provided on one side of said support, wherein one of said magnetic layers A contains magnetic particles having an aspect ratio of from 3 to less than 8 and the other magnetic layer B contains magnetic particles having an aspect ratio of from 8 to 12.

DETAILED DESCRIPTION OF THE INVENTION

The non-magnetic support and the magnetic layers which constitute the magnetic recording medium of the invention are detailed below:

Non-magnetic support

Materials usable as the non-magnetic support include polyesters such as polyethylene terephthalate and polyethylene-2.6-naphthalate: polyolefins such as polypropylene: cellulose derivatives such as cellulose triacetate and cellulose diacetate; plastics such as polycarbonate: metals such as copper, aluminum and zinc; glass plates: and various ceramics including so-called new ceramics such as boron nitride and silicon carbide.

The non-magnetic support, without any restrictions, is allowed to take any one of the tape, sheet, card, disk and drum forms. The support may be in a necessary form with an approriately selected material.

The thickness of the support, in the tape or sheet form, is normally 3 to 100μm, preferably 3 to 50 μm; and in the disk or card form, is normally 30 to 100μm. Further, in the case of a drum type, the support may be in the cylindrical form: thus it may take any form suitable for a recorder used.

On the non-magnetic support's side with no magnetic layers (reverse side) may be provided a backcoat layer for the purpose of improving the runability, antistaticity and antitransfer of the magnetic recording medium.

On the magnetic layer-provided side of the support may be provided an intermediate layer such as an adhesion layer for the purpose of improving the adherence between the magnetic layer and the support.

Magnetic layers

On one side of the non-magnetic support are provided at least magnetic layer A and magnetic layer B.

Magnetic layer A

Magnetic layer A is a layer which contains a ferromagnetic powder dispersed in its binder.

Examples of the ferromagnetic powder include Co-adsorbed $\gamma$-$Fe_2O_3$, powder, Co-adsorbed $\gamma$-$Fe_3O_4$ powder, Co-adsorbed $FeO_x$ ($4/3 < X < 3/2$) powder, Fe-Al metallic powder, Fe-Ni metallic powder, Fe-Al-Ni metallic powder, Fe-Al-P metallic powder, Fe-Ni-Si-Al metallic powder, Fe-Ni-Si-Al-Mn metallic powder, Ni-Co metallic powder, Fe-Mn-Zn metallic powder, Fe-Ni-Zn metallic powder, Fe-Co-Ni-Cr metallic powder, Fe-Co-Ni-P metallic powder, Co-Ni metallic powder and Co-P metallic powder.

The preferred among these powders is Co-adsorbed $\gamma$-Fe$_2$O$_3$ powder.

The coercive force (Hc) of any ferromagnetic powder suitably usable for the formation of the magnetic layer in the invention is normally not less than 550 Oersted, and preferably not less than 600 Oersted.

In the invention, the aspect ratio (length/width) $A^1$ of the ferromagnetic powder contained in magnetic layer A is required to be in the range of $3 \leq A^1 \leq 8$, and preferably $3.5 \leq A^1 \leq 7$.

If the aspect ratio is smaller than 3, it is liable to cause shedding, edge creases or dropout trouble to hardly improve the running durability, while if the ratio exceeds 8, it may invite deterioration of the running durability and may less improve the electromagnetic conversion characteristic.

The form of the ferromagnetic particles is not particularly restricted as long as the aspect ratio thereof are in the above ranges; for example, any one of needle, spherical and oblong forms may be used.

The binder used in the invention may be a conventional binder, but, from the standpoint of the dispersibility of magnetic particles and fillers, is preferably a resin modified by introducing a functional group or an intramolecular salt-forming functional group, such as particularly a modified vinyl chloride resin, a modified polyurethane resin or a modified polyester resin.

The functional group in the above resins includes —SO$_3$M, —OSO$_2$M, —COOM, and

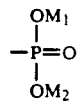

wherein M is a hydrogen atom, a lithium atom or a sodium atom; and M$_1$ and M$_2$ each is a hydrogen atom, a lithium atom, a potassium atom, a sodium atom or an alkyl group: provided that M$_1$ and M$_2$ may be either different or the same.

These functional groups can be introduced by the condensation through the dehydrochloric reaction of a resin, such as vinyl chloride resin, polyester resin and polyurethane resin, with a compound containing in its molecule an anionic functional group and chlorine, such as

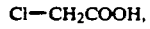 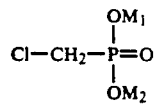

wherein M, M$_1$ and M$_2$ are as defined previously.

The preferred among the above resins thus obtained are those resins provided by introducing an anionic functional group into vinyl chloride resin and polyurethane resin.

Examples of the vinyl chloride resin include vinyl chloride-vinyl acetate-vinyl alcohol copolymer, vinyl chloride-vinyl propionate-vinyl alcohol copolymer, vinyl chloride-vinyl acetate-vinyl maleate-vinyl alcohol copolymer and vinyl chloride-vinyl propionate-vinyl maleate-vinyl alcohol copolymer.

In the invention, in addition to the above binder materials, if necessary, conventional non-modified vinyl chloride resin, polyurethane resin and polyester resin may also be mixedly used, and further, cellulose resin, phenoxy resin, and a resin usable in a specific manner such as thermoplastic resin, thermosetting resin, reaction-type resin, and electron beam setting resin may be used in combination.

Examples of the thermoplastic resin include vinyl chloride-vinyl acetate copolymer, vinyl chloride-vinyl acetatevinyl alcohol copolymer, vinyl chloride-vinylidene chloride copolymer, vinyl chloride-acrylonitrile copolymer, acrylate-acrylonitrile copolymer, acrylate-vinylidene chloride copolymer, methacrylate-vinylidene chloride copolymer, methacrylate-ethylene copolymer, urethane elastomer, polyvinyl fluoride, vinylidene chloride-acrylonitrile copolymer, acrylonitrile-butadiene copolymer, polyamide resin, polyvinyl butyral; cellulose derivatives such as cellulose acetatebutylate, cellulose diacetate, cellulose triacetate, cellulose propionate and cellulose nitrate; styrene-butadiene copolymer, polyester resin, chlorovinyl ether-acrylate copolymer, amino resin and synthetic rubber-type thermopolastic resin. These resins may be used alone or in combination.

Examples of the thermosetting or reactive-type resin include phenol resin, epoxy resin, polyurethane-setting resin, urea resin, melamine resin, alkyd resin, silicone resin, acryl-type reactive resin, a mixture of high molecular polyester resin and isocyanate prepolymer, a mixture of methacrylate copolymer and diisocyanate prepolymer, a mixture of polyester polyol and polyisocyanate, urea-formaldehyde resin, a mixture of low molecular glycol/high molecular diol/triphenylmethane triisocyanate, and polyamine resin. These resins may be used alone or in combination.

Examples of the electron beam setting resin include maleic anhydride-type, urethane-acryl-type, epoxyacryl-type, polyester-acryl-type, polyether-acryl-type. polyurethane-acryl-type and polyamidoacryl-type unsaturated prepolymers: and ether-acryl-type, urethane-acryl-type. epoxyacryl-type, phosphate-acryl-type, aryl-type and hydrocarbon-type multifunctional monomers. These resins may be used alone or in combination.

In the invention, any of the above resins may be used alone as the binder, and may also be used in combination with a hardening agent.

Suitable examples of the hardening agent include bifunctional isocyanates such as tolylenediisocyanate, diphenylmethanediisocyanate and hexanediisocyanate: trifunctional hardening agents such as Coronate L (product of Nippon Polyurethane Industry Co.) and Desmodur L (product of Bayer Co.); conventional hardening agents such as urethane prepolymers whose both terminals contain isocyanate groups: and polyisocyanate compounds usable as hardening agents. These agents may be used alone or in combination.

The using amount of the hardening agent is normally 5 to 80 parts by weight to the whole weight of the overall binders.

In magnetic layer A, the binder including the above hardening agent when used is incorporated in a proportion of normally 10 to 50 parts by weight, and preferably 15 to 30 parts by wieght per 100 parts by weight of the ferromagnetic powder. If the amount of the binder is too large, the incorporated amount of the ferromagnetic powder is relatively lowered. which may reduce the recording density of the magnetic recording medium, while if the amount is too small, the strength of magnetic layer A is lowered, which may cause decline of the running durability or deterioration of the layer-to-support adhesion of the medium.

Magnetic layer A may further contain a lubricant, an abrasive and an antistatic agent.

Examples of the lubricant include solid lubricants such as carbon black, graphite, carbon black-grafted copolymer, molybdenum disulfide and tungsten disulfide: silicone oil, modified silicon compounds, fatty acid esters, and fatty acids having 12 to 22 carbon atoms.

The preferred ones out of these compounds are carbon black, modified silicon compounds, fatty acids and fatty acid esters. These lubricants may be used alone or in combination.

The using amount of the lubricant is normally 0.05to 10 parts by weight per 100 parts by weight of the ferromagnetic powder.

Examples of the abrasive include inorganic powders such as aluminum oxide, titanium oxide (TiO, $TiO_2$), silicon oxide (SiO, $SiO_2$), silicon nitride, chromium oxide and boron carbide; and organic powders such as benzoguanamine resin powder, melamine resin powder and phthalocyanine compound powder.

The average particle sized of the abrasive is normally in in the range of 0.1to 1.0μm.

The incorporating amount of the abrasive is normally 0.5to 20 parts by weight per 100 parts by weight of the ferromagnetic powder.

Examples of the antistatic agent include conductive powders such as carbon black, graphite, tin oxide-antimony oxide-type compounds, tin oxide-titanium oxide-antimony oxide-type compounds and carbon black-grafted polymers; natural surfactants such as saponin: nonionic surfactants such as alkylene oxide-type, glycerol-type and glycidol-type compounds; cationic surfactants such as higher alkylamines, quaternary pyridines and other heterocyclic compounds, and phosphonium and sulfonium compounds: anionic surfactants such as carboxylic acid, sulfonic acid, phosphoric acid and those containing acid groups such as a sulfonate group and a phosphate group: and amphoteric surfactants such as amino acids, aminosulfonic acids, and sulfate and phosphate of aminoalcohols. These antistatic agents may be used alone or in combination.

The antistatic agent may be incorporated in an amount of 0.5 to 20 parts by weight per 100 parts by weight of the ferromagnetic powder.

Any of the above lubricant and antistatic agent has not only a single action: for example, there are cases where one compound acts not only as a lubricant but as an antistatic agent.

Magnetic layer B

Magnetic layer B is a layer which contains a ferromagnetic powder dispersed in its binder as well as magnetic layer A. Therefore, the ferromagnetic powder, binder and other components in magnetic layer B may be the same as those in magnetic layer A.

Provided, however, that magnetic layer B is different from magnetic layer A in the aspect ratio of the magnetic particles contained in the layer.

In the invention, the aspect ratio $A^2$ of the ferromagnetic powder contained in magnetic layer B is required to be in the range of $8 \leq A^2 \leq 12$, and preferably $8.5 \leq A^2 \leq 11.5$.

If the aspect ratio is smaller than 8, it may result in decline of the running durability, while if the ratio exceeds 12, it may deteriorate the electromagnetic conversion characteristic.

The magnetic recording medium of the invention comprises at least two magnetic layers each containing magnetic particles different in the aspect ratio thereof. One is magnetic layer A which contains magnetic particles having the aspect ratio of from not less than 3 to less than 8, and the other is magnetic layer B which contains magnetic particles having the aspect ratio of from not less than 8 to not more than 12. Generally, the magnetic layer in which magnetic material particles of a small aspect ratio are contained, is excellent in terms of the electromagnetic characteristics. On the other hand, running durability of the magnetic layer tends to be lowered. On the contrary, when the aspect ratio of magnetic particles is large, the magnetic layer bears low electromagnetic characteristics and high running durability. In the present invention, the object of the invention to provide a magnetic recording medium excellent in both of the electromagnetic characteristics and running durability is achieved by the combination of at least two magnetic layers each containing particles having specific aspect ratios different from each other.

The order of the magnetic layers A and B to be provided on the support is not limited to a specific one. Either magnetic layer A or magnetic layer B may be placed at the farthest position from the support, in other words, at the uppermost position. For instance, a preferable magnetic layer arrangement is described as follows:

(1) Magnetic layer A is placed at the uppermost position and magnetic layer B is placed at the closest position to the support of all the magnetic layers.
(2) Magnetic layer B is placed at the uppermost position and magnetic layer A is placed next to magnetic layer B.

The specific surface of magnetic particles, BET value, has an influence on the electromagnetic characteristics and running durability of the magnetic recording medium. In the embodiment of the present invention, it is preferable that the BET value of magnetic material particles contained in the uppermost magnetic layer and other magnetic layers be 50 to 70$m^2$/g and 40 to 50$m^2$/g, respectively. Especially when magnetic layer B, which contains magnetic material particles of a large aspect ratio, is placed at the uppermost position as described in Case (2), it is preferable that the magnetic particles of each magnetic layer have BET value the range of which is described above. When the magnetic recording medium is composed in such a manner as described above, the magnetic recording medium can be obtained which has further higher running durability and more excellent electromagnetic characteristics such as saturated magnetization Bm and a square ratio.

The thickness of the magnetic layer arranged at the uppermost position of magnetic layers is normally not more than 2μm, and preferably not more than 1.5μm. If the thickness exceeds 2μm, the characteristics resulting from is are far from those expected for the magnetic layer placed at lower position and may possibly be nothing but the same or less than in the case of a single magnetic layer alone. The thickness of the magnetic layer arranged at lower position is normally not more than 4μm, and preferably not more than 3μm. If the thickness exceeds 4μm, it may invite deterioration of the contact between the magnetic recording medium and a magnetic head, eventually causing drop of the output. The total thickness of the recording medium is normally not more than 6μm, and preferably not more than 4μm.

The specific surface area represented by the above BET value is a surface area per unit weight, and is a physical quantity quite different from an average particle size; for example, there are ones idential in the average particle size but different in the specific surface area. i.e., one having a large specific surface area and another having a small specific surface area. The specific surface area is measured by a specific surface area measuring method generally called B.E.T method. For details about the method, reference can be made to J. Ame. Chem. Soc. 60 309 (1938).

Next, a method for preparing the magnetic recording medium of the invention is explained.

The magnetic recording medium of the invention can be produced by coating on the previously mentioned support a magnetic coating liquid for magnetic layer A and a magnetic coating liquid for magnetic layer B which are prepared separately by kneading/dispersing into a solvent magnetic layer A forming components and magnetic layer B forming components, respectively, containing the foregoing ferromagnetic powders and binders.

Useful examples of the solvent used for the kneading/dispersion of magnetic layer A forming components and magnetic layer B forming components include ketones such as acetone, methyl-ethyl ketone (MEK), methyl-isobutyl ketone (MIBK) and cyclohexanone; alcohols such as methanol, ethanol, propanol and butanol; esters such as methyl acetate, ethyl acetate, butyl acetate, ethyl lactate, propyl acetate and ethylene glycol monoacetate; ethers such as diethylene glycoldimethyl ether, 2-ethoxyethanol, tetrahydrofuran and dioxane; aromatic hydrocarbons such as benzene, toluene and xylene; and halogenated hydrocarbons such as methylene chloride, ethylene chloride, carbon tetrachloride, chloroform, ethylenechlorohydrin and dichlorobenzene.

For the kneading/dispersion, there may be used any one of various types of kneaders, such as two-roll mill, three-roll mill, ball mill, pebble mill, side grinder, Sqegvari attriter, high-speed impeller disperser, high-speed stone mill, high-speed impact mill, disperkneader, high-speed mixer, homogenizer and ultrasonic disperser.

A dispersing agent may be used in the kneading/dispersion of the ferromagnetic powder.

Examples of the dispersing agent include lecithin, a phosphate, an amine compound, an alkyl sulfate, a fatty acid amide, a higher alcohol, polyethylene oxide, sulfosuccinic acid, a sulfosuccinate, a known surfactant and a salt thereof, and a dispersing agent for anionic organic groups (such as —COOH, —PO₃H) containing copolymers. These agents may be used alone or in combination.

The adding amount of the dispersing agent is normally 1 to 20 parts by weight per 100 parts by weight of the ferromagnetic powder.

The magnetic coating liquids thus prepared are coated by a known method on the foregoing non-magnetic support.

Examples of the coating method include gravure coating, wire-bar coating, doctor-blade coating, reverse-roll coating, dip coating, air-knife coating, calender coating, squeeze coating, kiss coating and fountain coating.

The coated magnetic layers, if necessary, are subjected to magnetic field orientation treatment before drying, and then to surface-smoothing treatment by means of a calender roller.

The coated product is then slit or cut into pieces in a desired form, whereby the magnetic recording medium can be obtained.

The magnetic recording medium, when slit into long rolls, may be used as magnetic tapes such as video tapes and audio tapes; when cut into pieces in a disk form, may be used as floppydisks; and may also be used in any other forms such as card form and cylindrical form as well as in conventional magnetic recording mediums.

EXAMPLES invention is illustrated in detail by the following examples.

EXAMPLE 1

Magnetic tape samples 1 through 7 were prepared in accordance with the following magnetic paint prescription for an upper layer and for a lower layer, and their characteristics were measured. In the prescription, the magnetic powder was changed for each sample as shown in Table 1.

The aspect ratio of the magnetic powder contained in each sample is described in Table 1.

The term 'part(s)' in the examples all means part(s) by weight.

| | |
|---|---|
| Co-γ-Fe$_2$O$_3$ | 100 parts |
| Sulfo-modified vinyl chloride/vinyl acetate/ vinyl alcohol copolymer | 13 parts |
| Polyester-polyurethane resin | 7 parts |
| α-Al$_2$O$_3$ (average particle size 0.1 μm) | 6 parts |
| Carbon black | 12 parts |
| Myristic acid | 4 parts |
| Stearic acid | 1 part |
| Butyl stearate | 1 part |
| Cyclohexanone | 180 parts |
| Methyl-ethyl ketone | 120 parts |
| Toluene | 120 parts |

The magnetic paints according to the above prescription were coated on a 14.5 μm-thick polyethylene terephthalate support to form thereon two layers, an upper layer of 1.5 μm in thickness and a lower layer of 2.0 μm in thickness, whereby inventive video tape samples, Sample 1 to Sample 3, and comparative samples, Sample 4 to Sample 7, were prepared.

TABLE 1

| Sample No. | Magnetic particle | | | | Square ratio | Electromagnetic characteristics (dB) | | | Drop-out | Shedding | Edge crease | Running durability after 200 pass |
|---|---|---|---|---|---|---|---|---|---|---|---|---|
| | Lower layer | | Upper layer | | | | | | | | | |
| | Aspect ratio | BET (m²/g) | Aspect ratio | BET (m²/g) | | RF-out | L-S/N | C-S/N | | | | |
| 1 (Inv.) | 8.2 | 40 | 4.5 | 50 | 0.89 | +0.8 | +0.6 | +1.4 | 24 | A | A | No flaws |
| 2 (Inv.) | 12.0 | 45 | 7.6 | 55 | 0.93 | +0.4 | +0.2 | +1.6 | 27 | A | A | No flaws |
| 3 (Inv.) | 9.2 | 48 | 7.9 | 50 | 0.92 | 0 | 0 | 0 | 36 | A | A | No flaws |
| 4 (Comp.) | 4.5 | 45 | 7.9 | 52 | 0.66 | 0 | +0.2 | −0.6 | 272 | D | C | Edge creases |

TABLE 1-continued

| Sample No. | Magnetic particle | | | | Square ratio | Electromagnetic characteristics (dB) | | | Drop-out | Shed-ding | Edge crease | Running durability after 200 pass |
|---|---|---|---|---|---|---|---|---|---|---|---|---|
| | Lower layer | | Upper layer | | | | | | | | | |
| | Aspect ratio | BET (m²/g) | Aspect ratio | BET (m²/g) | | RF-out | L-S/N | C-S/N | | | | |
| 5 (Comp.) | 9.2 | 45 | 12.0 | 52 | 0.90 | −1.8 | −1.1 | 0 | 161 | C | C | throughout No flaws |
| 6 (Comp.) | 7.9 | 45 | 7.6 | 52 | 0.72 | −1.0 | 0 | −0.9 | 171 | C | C | Flaws on back, particle edge creases |
| 7 (Comp.) | 8.2 | 45 | 9.2 | 52 | 0.84 | −1.2 | −0.8 | −0.2 | 145 | C | C | No flaws |

The Characteristics of the obtained samples were evaluated. The results are shown in Table 1.

As is apparent from Table 1, Samples 1 to 3 of the invention have excellent electromagnetic characteristics (RF output, Lumi S/N, square ratio) and no running trouble at all even after 200-time passing test as compared to the comparative Samples 4 to 7.

Evaluation method for the characteristics

Square ratio:

The proportion (Bm/Br) of residual magnetic flux density (Br) to saturated magnetic flux density (Bm) of each sample was measured with a VSM under the condition of a magnetic field of 10 KOe.

RF output (RF-OUT):

The reproduction output of each sample for 100% white signals was found in comparison with that of the reference tape inventive Sample 3 set at 0 dB.

Chroma S/N (C-S/N):

A noise meter, manufactured by Shibasoku Co., was used to find the difference in the S/N in chroma signals between each sample and the tape of inventive Sample 3 as reference (0 dB). The video deck used was a VHS-type video deck S-7000, manufactured by Victor Company of Japan, Ltd.

Lumi S/N (L-S/N):

The noise meter, manufactured by Shibasoku Co., was used to find the difference in the S/N in 100% white signals between each sample and the tape of inventive Sample 3 as reference (0dB). The video deck used was the same as in the above test.

Dropout: After 400-time repeated run of the tape under the condition of 40° C./80%RH, the dropout of the tape was measured by means of a VTR dropout counter, manufactured by Shibasoku Co.

Shedding:

After 400-time repeated run of the tape under the condition of 40° C./80%RH, the dirt by shedding on the tape was observed and classified into the following 4 grades:

A: No dirt.
B: Almost no dirt.
C: Dirt appears.
D: Considerable dirt.

Edge crease:

After 400-time repeated run of the tape under the condition of 40° C./80%RH, the presence of edge creases was examined and classified into the following 4 grades:

A: No edge creases.
B: Edges wavy.
C: Partial edge creases.
D: Overall edge creases.

Video tape running durability:

The conditions of both sides of each tape sample were visually examined after 200-time passing test at 40° C./80%RH by using a commercially available VHS-type video cassette deck.

EXAMPLE 2

Sample 11 of the invention was prepared as follows:

Each of the lower magnetic layer components and the upper layer components of the following compositions was sufficiently kneaded to be dispersed by a ball mill, and 5 parts of a polyisocyanate compound were added thereto to thereby prepare magnetic coating liquids.

| Lower magnetic layer composition | |
|---|---|
| Co-adsorbed γ-Fe₂O₃ ferromagnetic powder (BET value 40 m²/g, aspect ratio 3) | 100 parts |
| α-Al₂O₃ (average particle size 0.2 μm) | 5 parts |
| Carbon black (average particle size 40 μm) | 3 parts |
| Polyvinyl chloride-type copolymer MR110 containing potassium sulfonate (product of Japanese Geon Co.) | 13 parts |
| Polyester-polyurethane, Esthane 5701 (product of Goodrich Co.) | 1 part |
| Myristic acid | 1 part |
| Stearic acid | 1 part |
| Butyl stearate | 2 parts |
| Cyclohexanone | 100 parts |
| Methyl-ethyl ketone | 100 parts |
| Toluene | 100 parts |

| Upper magnetic layer composition | |
|---|---|
| Co-adsorbed γ-Fe₂O₃ ferromagnetic powder (BET value 50 m²/g, aspect ratio 8) | 100 parts |

Other components: the kinds and amounts thereof are quite the same as those of the lower magnetic layer composition.

The lower magnetic layer coating liquid obtained was coated on a 13μm-thick polyethylene terephthalate non-magnetic support, and then on this layer, before being dried, was coated the upper magnetic layer coating liquid. The coated layers were treated for magnetic field orientation, dried, and then subjected to supercalender treatment, whereby a magnetic layer comprised of the lower and upper magnetic layers was formed. The dry thickness of the lower magnetic layer was 2.5μm, and that of the upper layer was 1.0μm.

The BET values and the aspect ratios of the ferromagnetic powder in the lower and upper magnetic layers are shown in Table 2.

Subsequently, a backcoat coating liquid was prepared by dispersing the following backcoat coating composition for 5 hours by a ball mill, and this coating liquid was coated so as to form a backcoat layer with a dry thickness of 0.5μm on back of the support having the above magnetic layers, whereby a bulk film web for making magnetic tapes was produced.

| Carbon black | 50 parts |
| --- | --- |
| Nitrocelluse | 20 parts |
| Polyurethane resin | 20 parts |
| Methyl-ethyl ketone | 200 parts |
| Toluene | 200 parts |

The obtained bulk film web was slit into magnetic tape rolls for use as video tapes.

The video tape was evaluated in the same manner as in Example I. The results are shown in Table 2.

Samples 12 to 15 of the invention and comparative samples 16 to 18 were prepared.

Magnetic layers were formed in the same manner as Example 11 except that the ferromagnetic powder contained in the first magnetic layer composition and the second magnetic layer composition in Example 11 was replaced by the ferromagnetic powders given in Table 2.

Then, video tape samples were prepared in the same manner as in Example 11, and the reproduction output of each tape was measured. The results are shown in Table 2.

EXAMPLE 3

Three kinds of magnetic paints were prepared each containing magnetic particles different in the aspect ratio from each other. The magnetic paints were prepared by the prescription used in Example 2 except that the polyesterpolyurethane was replaced by a polyesterpolyurethane modified with sulfonic acid. The magnetic paints were coated in layers on a support the same as used in Example 2 to prepare Sample 21 having three magnetic layers, in order lower layers, middle layer and upper layer from the support. The aspect ratios of magnetic particles each contained in the layers are shown in Table 3. The dry-thicknesses of the lower, middle and upper layers were 2.5, 0.7 and 0.3μm, respectively. The sample was applied with a backcoat in the same manner as described in Example 2 and was slit into magnetic tape rolls for use as video tapes.

Further, Samples 22 through 35 were prepared identically to Sample 21 except that magnetic particles used in the magnetic layer were changed so that the aspect ratios and BET values of the magnetic particles in each layer were made as shown in Table 3. Among these samples, Sample 33 to 36 were comparative in each of which all of three magnetic layers contain magnetic

TABLE 2

| Sample No. | Magnetic particle | | | | Square ratio | Electromagnetic characteristics (dB) | | | Drop-out | Shed-ding | Edge crease | Running durability after 200 pass |
| --- | --- | --- | --- | --- | --- | --- | --- | --- | --- | --- | --- | --- |
| | Lower layer | | Upper layer | | | | | | | | | |
| | Aspect ratio | BET (m²/g) | Aspect ratio | BET (m²/g) | | RF-out | L-S/N | C-S/N | | | | |
| 11 (Inv.) | 3.0 | 40 | 8.0 | 50 | 0.92 | +0.9 | +1.0 | +0.9 | 20 | A | A | No flaws |
| 12 (Inv.) | 7.0 | 40 | 12.0 | 50 | 0.91 | +1.0 | +0.8 | +0.8 | 40 | A | A | No flaws |
| 13 (Inv.) | 3.0 | 49 | 8.0 | 60 | 0.89 | +0.6 | +1.4 | +1.9 | 58 | A | A | No flaws |
| 14 (Inv.) | 5.0 | 49 | 10.0 | 70 | 0.90 | +0.8 | +1.2 | +2.0 | 65 | A | A | No flaws |
| 15 (Inv.) | 4.0 | 45 | 9.0 | 55 | 0.91 | +0.8 | +1.0 | +1.5 | 42 | A | A | No flaws |
| 16 (Comp.) | 3.0 | 45 | 1.0 | 55 | 0.52 | −0.3 | −0.5 | −0.2 | 345 | D | D | Edge creases throughout |
| 17 (Comp.) | 3.0 | 45 | 7.0 | 55 | 0.58 | −1.0 | −1.1 | −0.9 | 220 | D | C | Edge creases at lead portion |
| 18 (Comp.) | 8.0 | 45 | 12.0 | 55 | 0.88 | −2.3 | −1.4 | −0.4 | 131 | C | C | No flaws |

As is apparent from Table 2, the magnetic recording medium samples of the invention have more excellent S/N ratios, more improved electromagnetic coversion characteristics, are less liable to cause dropout, shedding and edge creases, and have more improved running durability than the samples in the comparative examples.

particles having aspect ratios more than 8.

The samples were evaluated in the same manner as Example 2. Further, the chroma output (C-OUT) of the samples at 500 kHz were determined by the same procedure as the RF-output. The thus obtained test results are listed in Table 3.

As is shown in Table 3, the samples of the invention are superior to the comparative samples in both of the electromagnetic characteristics and running durability.

TABLE 3

| Sample No. | Magnetic particle | | | | | | Square ratio | Electromagnetic characteristics (dB) | | | |
| --- | --- | --- | --- | --- | --- | --- | --- | --- | --- | --- | --- |
| | Lower layer | | Middle Layer | | Upper layer | | | | | | |
| | Aspect ratio | BET (m²/g) | Aspect ratio | BET (m²/g) | Aspect ratio | BET (m²/g) | | RF-out | L-S/N | C-OUT | C-S/N |
| 21 (Inv.) | 8.2 | 45 | 6.0 | 55 | 3.2 | 65 | 0.93 | +1.8 | +1.5 | +2.4 | +2.2 |
| 22 (Inv.) | 8.2 | 40 | 6.0 | 50 | 3.2 | 65 | 0.94 | +2.0 | +1.6 | +2.1 | +1.8 |
| 23 (Inv.) | 11.5 | 45 | 8.1 | 55 | 3.2 | 65 | 0.95 | +1.8 | +1.8 | +2.3 | +2.0 |
| 24 (Inv.) | 11.5 | 40 | 8.1 | 50 | 3.2 | 65 | 0.94 | +2.0 | +2.2 | +2.0 | +2.0 |
| 25 (Inv.) | 7.5 | 45 | 10.5 | 55 | 3.2 | 65 | 0.90 | +1.6 | +1.8 | +0.5 | +0.7 |
| 26 (Inv.) | 7.5 | 40 | 10.5 | 50 | 3.2 | 65 | 0.90 | +1.8 | +2.0 | +0.6 | +0.5 |
| 27 (Inv.) | 7.9 | 42 | 3.2 | 65 | 11.0 | 50 | 0.87 | −0.2 | −0.2 | 0 | 0 |
| 28 (Inv.) | 10.5 | 40 | 3.2 | 65 | 11.0 | 50 | 0.87 | −0.1 | −0.1 | −0.1 | 0 |
| 29 (Inv.) | 5.5 | 45 | 3.4 | 50 | 8.0 | 65 | 0.92 | +0.6 | +0.5 | +0.7 | +0.8 |
| 30 (Inv.) | 5.5 | 45 | 3.4 | 70 | 8.0 | 65 | 0.87 | 0 | +0.2 | +0.2 | +0.2 |
| 31 (Inv.) | 9.0 | 42 | 3.4 | 50 | 8.0 | 65 | 0.92 | +0.7 | +0.4 | +0.6 | +0.4 |
| 32 (Inv.) | 9.0 | 42 | 3.4 | 70 | 8.0 | 65 | 0.88 | 0 | +0.1 | 0 | −0.2 |
| 33 (Comp.) | 10.5 | 40 | 8.2 | 60 | 11.0 | 50 | 0.88 | −0.1 | 0 | −0.1 | 0 |
| 34 (Comp.) | 11.6 | 40 | 10.2 | 45 | 8.0 | 65 | 0.86 | −0.1 | 0 | 0 | −0.1 |
| 35 (Comp.) | 11.6 | 40 | 10.2 | 55 | 8.0 | 65 | 0.86 | −0.1 | +0.1 | 0 | 0 |

TABLE 3-continued

| | | | | | | | | | | | |
|---|---|---|---|---|---|---|---|---|---|---|---|
| 36 (Comp.) | 3.0 | 65 | 2.8 | 55 | 2.5 | 50 | 0.54 | +2.4 | +2.6 | −0.9 | −2.4 |

| Sample No. | Drop-out | Sted-ding | Edge crease | Running durability after 200 pass | after 400 pass |
|---|---|---|---|---|---|
| 21 (Inv.) | 26 | A | A | Good | Flaws on back |
| 22 (Inv.) | 24 | A | A | Good | Flaws on back |
| 23 (Inv.) | 22 | A | A | Good | Flaws on back |
| 24 (Inv.) | 26 | A | A | Good | Flaws on back |
| 25 (Inv.) | 22 | A | A | Good | Flaws on back |
| 26 (Inv.) | 23 | A | A | Good | Flaws on back |
| 27 (Inv.) | 12 | A | A | Good | Good |
| 28 (Inv.) | 8 | A | A | Good | Good |
| 29 (Inv.) | 4 | A | A | Good | Good |
| 30 (Inv.) | 14 | A | A | Good | Good |
| 31 (Inv.) | 8 | A | A | Good | Good |
| 32 (Inv.) | 12 | A | A | Good | Good |
| 33 (Comp.) | 12 | A | A | Flaws on back | Flaws on back |
| 34 (Comp.) | 18 | A | A | Flaws on back | Flaws on back |
| 35 (Comp.) | 16 | A | A | Flaws on back | Flaws on back |
| 36 (Comp.) | 146 | D | D | Stop | — |

What is claimed is:

1. A magnetic recording medium comprising a support and at least two magnetic layers provided on one side of said support, wherein one of said magnetic layers A contains a binder and magnetic particles having an aspect ratio of from 3 to less than 8 and another magnetic layer B contains a binder and magnetic particles having an aspect ratio of from 8 to 12.

2. The medium of claim 1, wherein said magnetic layer A is arranged at the position furthest from said support among said magnetic layers.

3. The medium of claim 2, wherein said magnetic layer B is arranged at the position closest to said support among said magnetic layers.

4. The medium of claim 2, wherein said magnetic layer A contains a modified polymer having a functional group selected from the group consisting of an —SO$_3$M group, an —OSO$_2$M group, a —COOM group and

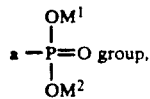

wherein M is a hydrogen atom, a lithium atom or a sodium atom, M$^1$ and M$^2$, are each a hydrogen atom, a lithium atom, a potassium atom, a sodium atom or an alkyl group.

5. The medium of claim 4, wherein said modified polymer is a modified polyvinyl chloride having said functional group.

6. The medium of claim 4, wherein said modified polymer is a modified polyurethane having said functional group.

7. The medium of claim 4, wherein said magnetic layer B also contains said modified polymer.

8. The medium of claim 1, wherein said magnetic layer B is arranged at the position furthest from said support among said magnetic layers.

9. The medium of claim 8, wherein said magnetic layer A is arranged so as to be adjacent to said layer B.

10. The medium of claim 8, wherein said magnetic particles contained in said magnetic layer B have a BET value of specific surface area of from 50 m$^2$/g to 70 m$^2$/g and said magnetic particles contained in said magnetic layer A have a BET value of specific surface area of from 40 m$^2$/g to 50 m$^2$/g.

11. The medium of claim 8, wherein said said magnetic layer B contains a modified polymer having a functional group selected from the group consisting of an —SO$_3$M group, an —OSO$_2$M group, a —COOM group and

wherein M is a hydrogen atom, a lithium atom or a sodium atom, M$^1$ and M$^2$ are each a hydrogen atom, a lithium atom, a potassium atom, a sodium atom or an alkyl group.

12. The medium of claim 11, wherein said modified polymer is a modified polyvinyl chloride having said functional group.

13. The medium of claim 11, wherein said modified polymer is a modified polyurethane having said functional group.

14. The medium of claim 11, wherein said magnetic layer A also contains said modified polymer.

* * * * *